United States Patent [19]
Hellwig

[11] Patent Number: 5,337,851
[45] Date of Patent: Aug. 16, 1994

[54] STEERING MECHANISM FOR ROAD CUTTER

[75] Inventor: Helmut Hellwig, Bad Oeynhausen, Fed. Rep. of Germany

[73] Assignee: AGB - Werke GmbH, Hameln, Fed. Rep. of Germany

[21] Appl. No.: 18,695

[22] Filed: Feb. 17, 1993

[30] Foreign Application Priority Data

Feb. 26, 1992 [DE] Fed. Rep. of Germany ....... 4205878

[51] Int. Cl.$^5$ .............................................. B62D 5/00
[52] U.S. Cl. ................................ 180/162; 180/79.3; 180/163
[58] Field of Search ............... 180/154, 159, 160, 161, 180/162, 163, 79, 79.3

[56] References Cited

U.S. PATENT DOCUMENTS 3,853,069 12/1974 Goodwin ............................ 180/79
4,301,882 11/1981 Dera et al. ........................ 180/162

*Primary Examiner*—Mitchell J. Hill
*Attorney, Agent, or Firm*—Chilton, Alix & Van Kirk

[57] ABSTRACT

A steering mechanism for use on a pavement cutting machine or the like, the cutting machine having a pair of guide wheels which are coupled to the chassis of the machine through steering knuckles. The steering mechanism is operated by means of a fluidic actuator connected between the chassis and one of the steering knuckles. In order to insure that the guide wheels will turn together, the steering knuckles are interconnected by a pair of serially connected rods with the point of interconnection of the rods being the free end of a pivotal lever, the opposite end of the lever being connected to the chassis.

20 Claims, 4 Drawing Sheets

STEERING MECHANISM FOR ROAD CUTTER

BACKGROUND OF THE INVENTION

1. Field of the Invention

This invention relates to increasing the maneuverability of apparatus for milling or cutting grooves in road surfaces and particularly to improving the ability to steer such apparatus so as to enable the paved surface being worked to be cut in close proximity to obstructions such as manhole covers. More specifically, the present invention is directed to an improved steering mechanism for a road cutter or the like and especially to a steering mechanism which permits such highway maintenance apparatus to be turned through a substantially greater steering angle than has previously been possible. Accordingly, the general objects of the present invention are to provide novel and improved methods and apparatus of such character.

2. Description of the Prior Art

Highway grooving or milling machines are well known in the art. An exemplary machine for milling road surfaces is shown in Canadian Patent No. 994,145. The typical prior art road cutter is provided with a pair of forwardly mounted guide wheels. These guide wheels are customarily provided with independent hydraulic drives which may, for example, include hub mounted gearing. In order to steer a road cutter, the guide wheels are supported so as to be rotatable relative to the chassis of the apparatus. The prior art guide wheel steering mechanism includes a steering knuckle associated with each wheel. The guide wheels of the typical prior art road cutter are supported from a rocker arm and the steering knuckles are interconnected by means of a track rod. A fluidic actuator is connected between the rocker arm and one of the steering knuckles. The angular orientation of the guide wheels relative to the chassis of the apparatus may thus be changed to a newly desired steering angle by energizing the fluidic actuator. This arrangement, in effect, is a parallelogram-type linkage which inherently provides a relatively small maximum steering angle. Under certain operating conditions the maximum obtainable steering angle which may be achieved through use of such a parallelogram linkage does not afford adequate maneuverability. For example, when a prior art steering mechanism of the type described is employed, it has been found to be extremely difficult to mill the road surface closely about the periphery of a manhole cover or the like.

SUMMARY OF THE INVENTION

The present inventon overcomes the above briefly-discussed and other deficiencies and disadvantages of the prior art by substantially increasing the maneuverability of a road cutter or the like. This enhanced maneuverability results from a novel method by which the steering angle through which the guide wheels of a road cutter may be turned is substantially increased thereby making it possible to cut flush around manhole covers or the like, at least in one direction. This invention also encompasses a novel steering apparatus for implementing the aforesaid method.

In apparatus in accordance with a preferred embodiment of the invention, the guide wheels of a road cutter are mounted so as to be rotatable, by means of steering knuckles, relative to the chassis of the apparatus. A lever is coupled to the chassis of the apparatus so as to be pivotal about the longitudinal axis thereof whereby the free end of the lever may be moved toward one or the other of the steering knuckles. First ends of a pair of connecting rods are linked to the free end of the pivotal lever. The opposite ends of the connecting rods are coupled to respective of the steering knuckles. At least one of the connecting rods is bent at an angle so as to define a crank portion. Changes in the desired guide wheel steering angle, in the form of displacement of the piston of a fluidic actuator, are simultaneously transmitted to the guide wheels by pivotally mounting the actuator cylinder housing on a rocker arm and articulating the piston rod of the actuator to one of the steering knuckles. The rocker arm is mounted on the chassis and the steering knuckles are, in turn, connected to opposite ends of the rocker arm by king pins.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENT

Figure 2:
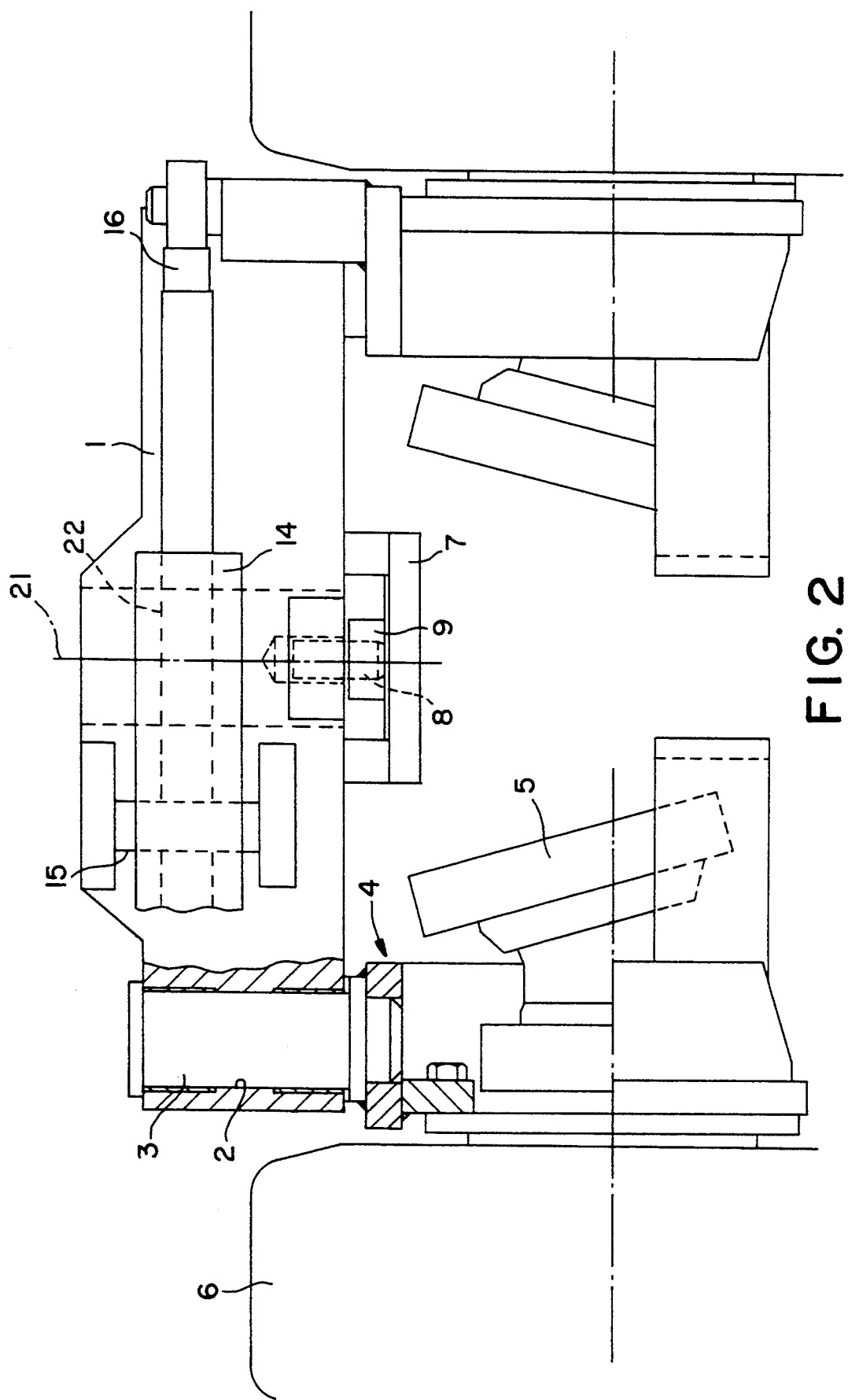
FIG. 2 is a front elevational view, partly in section, depicting the axle arrangement of FIG. 1.

With reference now to the drawings, and bearing in mind that the present invention is depicted in the environment of a road cutter, the cutter is provided with a pair of front guide wheels 6 which are driven via hydraulic hub gearing arrangements such as indicated schematically at 5 in FIG. 2. A rocker arm 1, which is arranged transversely with respect to the longitudinal axis 21 of the chassis 20 of the road cutter apparatus, is affixed to, and thus forms part of, the chassis 20. Rocker arm 1, accordingly, is also oriented transversely with respect to the straight-ahead travel direction of the road cutter. Rocker arm 1 is provided, at its opposite ends, with vertical bores 2. King pins 3 of the steering knuckles 4 of the respective guide wheels 6 are received in the vertical bores 2. The steering knuckles 4 are, in the conventional manner, connected to respective of the front guide wheels 6. Thus, the rocker arm 1 serves as the mounting for the steering knuckles 4.

Figure 1:
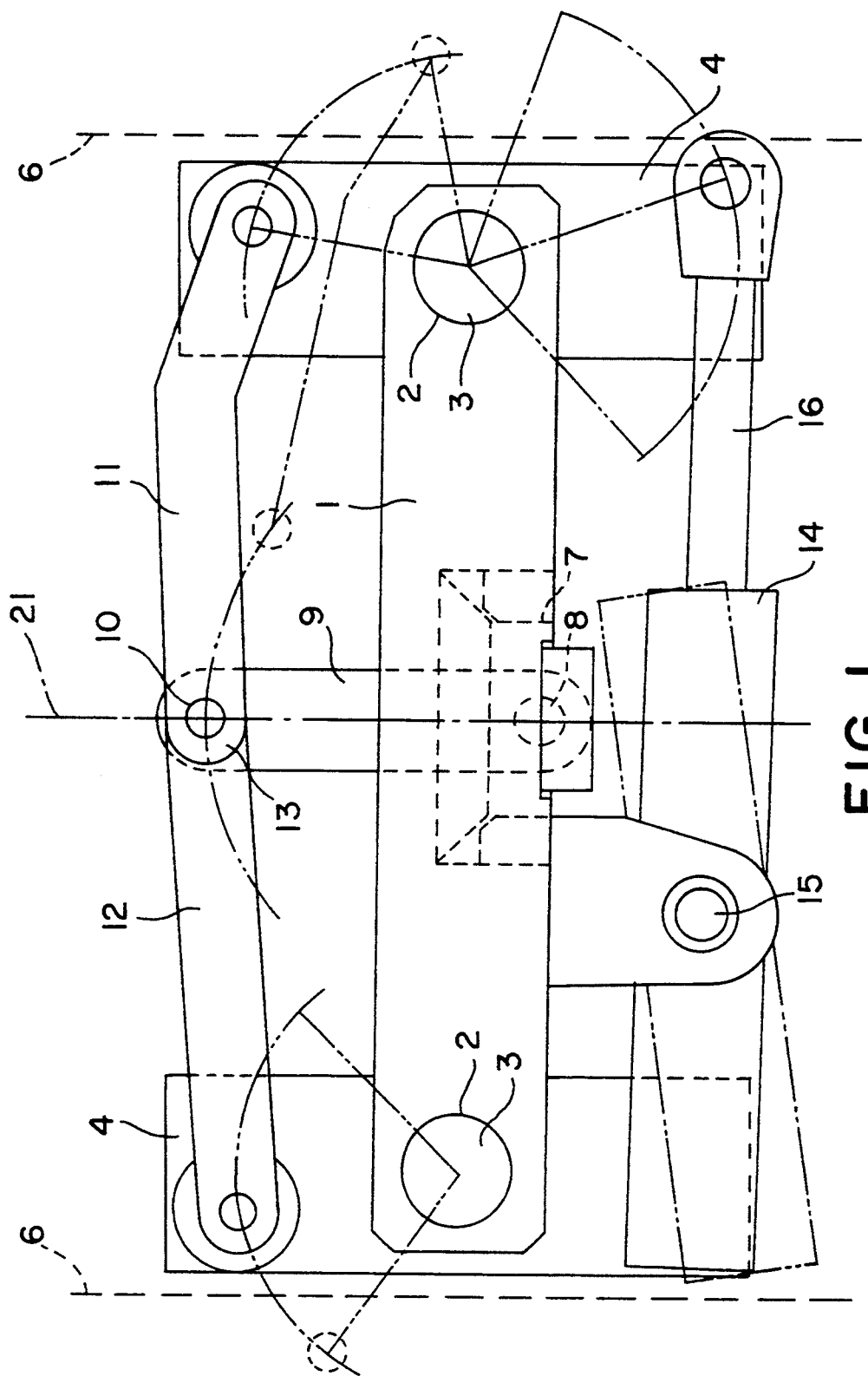
FIG. 1 is a schematic top view of a front axle arrangement for a road cutter incorporating the present invention.

In a region bridging the center line of the chassis, and on the underside thereof, the rocker arm 1 is provided with a mounting bracket 7. Mounting bracket 7 supports a vertical swivel journal, i.e., a vertically oriented pivot pin 8, which engages the first end of a lever 9. Lever 9 is generally horizontally oriented and, as may be seen from FIG. 1, may pivot about pin 8 and thus about the center line of the chassis. The pin 8 is also supported by rocker arm 1 as best seen from FIG. 2. Referring again to FIG. 1, the mounting bracket 7, in addition to supporting journal 8, functions as a bilateral stop for lever 9. Thus, lever 9 can be swiveled, in either the clockwise or counterclockwise direction relative to the center position as shown in FIG. 1 where it is in alignment with the longitudinal axis of the chassis. The angle through which lever 9 may swing, however, is maintained within safe limits by mechanical stops defined by bracket 7. This angle may, for example, be 30° to both sides of the median position shown in FIG. 1.

Figure 3:
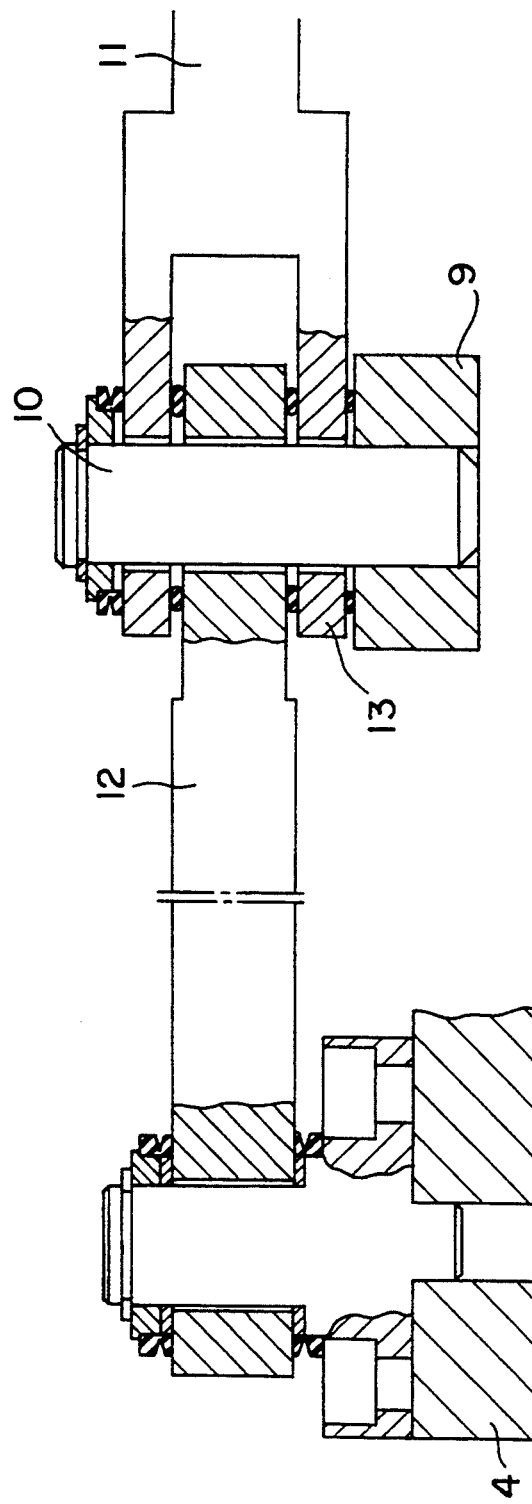
FIG. 3 is a partial enlarged front elevational view, partly in section, of a portion of the axle arrangement of FIGS. 1 and 2.
Figure 4:
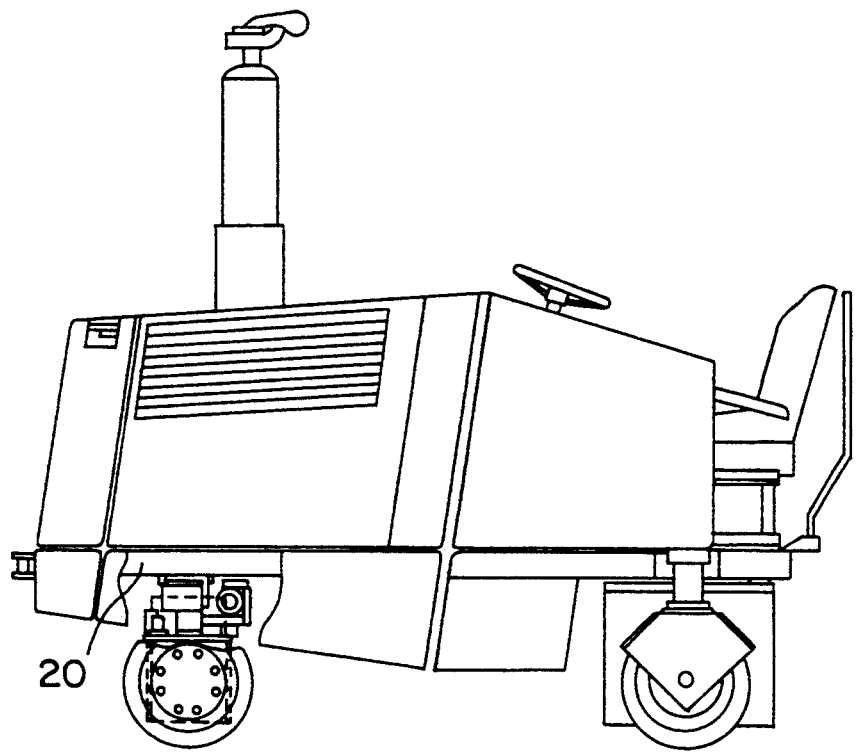
FIG. 4 is a side view, partly broken away of a road cutter incorporating a steering mechanism in accordance with the present invention.
Figure 5:
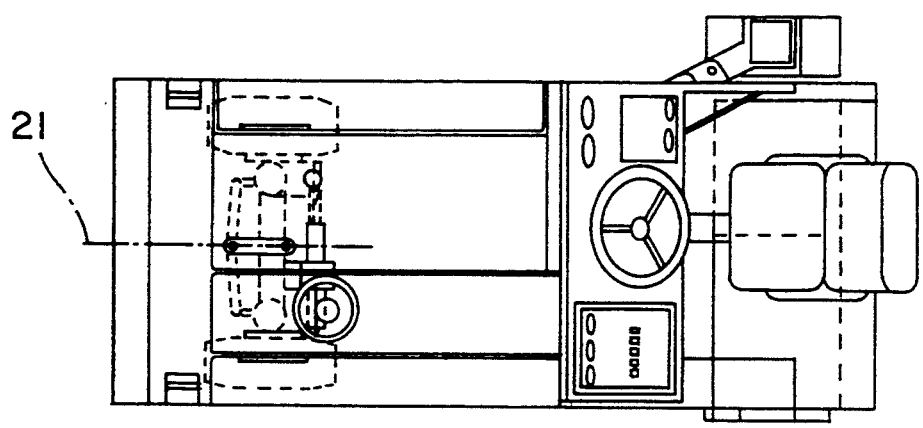
FIG. 5 is a top view, partly broken away of the road cutter of FIG. 4.

Referring to FIGS. 1 and 3, a further journal or pivot pin 10 is provided at the free end of lever 9. Journal 10 engages first ends of a pair of connecting rods 11 and 12. Connecting rods 11 and 12 are movable in a common horizontal plane and, in order to achieve this spacial relationship, in the disclosed embodiment the connecting rod 11 is provided with a fork-shaped portion. The end of rod 12 is received in the fork-shaped end of rod 11 and both rods are engaged by journal 10. The opposite ends of connecting rods 11 and 12, i.e., the ends disposed outwardly with respect to the pivotal connection to lever 9, are pivotally linked to respective steering knuckles 4. The manner in which this linkage is achieved may best be seen from FIG. 3. In the disclosed embodiment connecting rod 11 is "cranked", i.e., is provided with an angularly offset portion or bend, in the direction of the rocker arm 1. The angle between the axes of the two portions of connecting rod 11 may, for example, be approximately 20°.

A fluidic actuator, the actuator having a cylinder defining member 14 and a piston rod 16, is connected between rocker arm 1 and one of the steering knuckles 4. Referring to FIG. 1, the cylinder defining member 14 is pivotally supported, by means of a vertically oriented swivel journal 15 and a mounting bracket therefor, from rocker arm 1. The connection between piston rod 16 and the right side steering knuckle 4 is also an articulated joint. By varying the pressure at the opposite sides of the piston 22 in cylinder defining member 14, the piston rod 16 which is connected to the piston 22 may be extended or retracted whereby the steering knuckle 4 which is linked to the piston rod 16 will be caused to pivot either clockwise or counterclockwise about the axis of its associated king pin 3. This pivotal motion will be transmitted, via the interconnected rods 11 and 12, to the oppositely disposed steering knuckle. The disclosed arrangement, and particularly the connection of the cylinder housing 14 to the rocker arm 1 at a point disposed approximately midway along the length of housing 14, minimizes the structural depth of the actuating mechanism.

The above-described steering mechanism, particularly the arrangement of pivotal lever 9 and associated connecting rods 11, 12 linked thereto, permits a very large steering angle to be achieved. The magnitude of the steering angle is further increased by the cranking of one of the connecting rods. The overall result is a highly maneuverable road cutter which, in the case of the disclosed embodiment, may achieve a flush cut as it operates to the right around a manhole in an uninterrupted working operation.

While a disclosed embodiment has been shown and described, various modifications and substitutions may be made thereto without departing from the spirit and scope of the invention. Accordingly, it is to be understood that the present invention has been described by way of illustration and not limitation.

What is claimed is:

1. An improved steering mechanism for a machine having guide wheels and a chassis, the chassis defining a longitudinal axis, the guide wheels being offset to opposite sides of said axis, the guide wheels defining axes about which the guide wheels rotate, the longitudinal axis and the wheel axes defining a steering angle, said improved steering mechanism comprising:

steering knuckle means for pivotally coupling respective of the guide wheels to the chassis whereby the steering angle between the guide wheel axes and a vertical plane which includes said longitudinal axis may be varied;

fluidic actuator means connected between the chassis and one of said knuckle means for imparting movement to a component of said one knuckle means which is affixed to an associated guide wheel whereby said steering angle of said guide wheel may be adjusted;

a lever, said lever being connected to the chassis so as to be pivotal about said longitudinal axis, said lever having a free end which is movable toward one or the other of said knuckle means during pivotal movement of said lever;

a first connecting rod extending between said free end of said lever and a first of said steering knuckle means; and a second connecting rod extending between said free end of said lever and a second of said steering knuckle means, said second connecting rod being provided with a bent end portion whereby said second connecting rod is cranked in the direction of said lever, movements of said one knuckle means produced by said actuator means being transmitted to the other of said knuckle means via said first and second connecting rods.

2. The apparatus of claim 1 wherein said second connecting rod is connected to said knuckle means.

3. The apparatus of claim 2 further comprising:
   stop means for limiting the movement of said lever toward each of said knuckle means.

4. The apparatus of claim 3 wherein the chassis includes a rocker arm having opposite ends, said steering knuckle means being coupled to the rocker arm adjacent said opposite ends, and wherein said lever is pivotally connected to the rocker arm.

5. The apparatus of claim 4 wherein said actuator means comprises:
   a cylinder housing, a piston being disposed for movement within said cylinder housing;
   a piston rod connected to said piston and extending from said cylinder housing; and
   mounting means for pivotally supporting said cylinder housing at a point intermediate its length from the chassis.

6. The apparatus of claim 2 wherein the chassis includes a rocker arm having opposite ends, said steering knuckle means being coupled to the rocker arm adjacent said opposite ends, and wherein said lever is pivotally connected to the rocker arm.

7. The apparatus of claim 2 wherein said actuator means comprises:
   a cylinder housing, a piston being disposed for movement within said cylinder housing;
   a piston rod connected to said piston and extending from said cylinder housing; and
   mounting means for pivotally supporting said cylinder housing at a point intermediate its length from the chassis.

8. The apparatus of claim 1 further comprising:

stop means for limiting the movement of said lever toward each of said knuckle means.

9. The apparatus of claim 8 wherein said actuator means comprises:
   a cylinder housing, a piston being disposed for movement within said cylinder housing;
   a piston rod connected to said piston and extending from said cylinder housing; and
   mounting means for pivotally supporting said cylinder housing at a point intermediate its length from the chassis.

10. The apparatus of claim 1 wherein the chassis includes a rocker arm having opposite ends, said steering knuckle means being coupled to the rocker arm adjacent said opposite ends, and wherein said lever is pivotally connected to the rocker arm.

11. The apparatus of claim 10 wherein said actuator means comprises:
   a cylinder housing, a piston being disposed for movement within said cylinder housing;
   a piston rod connected to said piston and extending from said cylinder housing; and
   mounting means for pivotally supporting said cylinder housing at a point intermediate its length from the chassis.

12. The apparatus of claim 1 wherein said actuator means comprises:
   a cylinder housing, a piston being disposed for movement within said cylinder housing;
   a piston rod connected to said piston and extending from said cylinder housing; and
   mounting means for pivotally supporting said cylinder housing at a point intermediate its length from the chassis.

13. The apparatus of claim 1 wherein said steering knuckle means include king pins which are supported in the chassis, the king pins defining axes about which the guide wheels may be rotated to change the steering angle thereof, and wherein said connecting rods move in a common plane.

14. The apparatus of claim 13 wherein said second connecting rod is connected to said knuckle means.

15. The apparatus of claim 14 further comprising:
   bracket means for pivotally coupling said lever to the chassis, said bracket means defining a pair of oppositely disposed mechanical stops which limit the motion of said lever toward each of said knuckle means.

16. The apparatus of claim 15 wherein the chassis includes a rocker arm having opposite ends, said steering knuckle means being coupled to the rocker arm adjacent said opposite ends, and wherein said lever is pivotally connected to the rocker arm.

17. The apparatus of claim 16 wherein said actuator means comprises:
   a cylinder housing, a piston being disposed for movement within said cylinder housing;
   a piston rod connected to said piston and extending from said cylinder housing; and
   mounting means for pivotally supporting said cylinder housing at a point intermediate its length from the chassis.

18. The apparatus of claim 13 wherein the chassis includes a rocker arm having opposite ends, said steering knuckle means being coupled to the rocker arm adjacent said opposite ends, and wherein said lever is pivotally connected to the rocker arm.

19. The apparatus of claim 13 wherein said actuator means comprises:
   a cylinder housing, a piston being disposed for movement within said cylinder housing;
   a piston rod connected to said piston and extending from said cylinder housing; and
   mounting means for pivotally supporting said cylinder housing at a point intermediate its length from the chassis.

20. The apparatus of claim 15 wherein said actuator means comprises:
   a cylinder housing, a piston being disposed for movement within said cylinder housing;
   a piston rod connected to said piston and extending from said cylinder housing; and
   mounting means for pivotally supporting said cylinder housing at a point intermediate its length from the chassis.

* * * * *